United States Patent
Walser et al.

(10) Patent No.: US 8,346,392 B2
(45) Date of Patent: Jan. 1, 2013

(54) METHOD AND SYSTEM FOR THE HIGH-PRECISION POSITIONING OF AT LEAST ONE OBJECT IN A FINAL LOCATION IN SPACE

(75) Inventors: Bernd Walser, Heerbrugg (CH); Bernhard Metzler, Dornbirn (AT); Beat Aebischer, Heerbrugg (CH); Knut Siercks, Moerschwil (CH); Bo Pettersson, London (GB)

(73) Assignee: Leica Geosystems AG, Heerbrugg (CH)

( * ) Notice: Subject to any disclaimer, the term of this patent is extended or adjusted under 35 U.S.C. 154(b) by 416 days.

(21) Appl. No.: 12/810,797

(22) PCT Filed: Dec. 17, 2008

(86) PCT No.: PCT/EP2008/067725
§ 371 (c)(1),
(2), (4) Date: Jun. 25, 2010

(87) PCT Pub. No.: WO2009/083452
PCT Pub. Date: Jul. 9, 2009

(65) Prior Publication Data
US 2010/0274390 A1 Oct. 28, 2010

(30) Foreign Application Priority Data
Dec. 27, 2007 (EP) .................................. 07124101

(51) Int. Cl.
*G05B 19/00* (2006.01)
(52) U.S. Cl. ...................................................... 700/259
(58) Field of Classification Search .................... 700/259
See application file for complete search history.

(56) References Cited

U.S. PATENT DOCUMENTS

| 4,396,945 | A | | 8/1983 | DiMatteo et al. |
| 4,796,200 | A | | 1/1989 | Pryor |
| 4,851,905 | A | | 7/1989 | Pryor |
| 4,941,106 | A | * | 7/1990 | Krieger ........................ 700/259 |
| 5,380,978 | A | | 1/1995 | Pryor |

(Continued)

FOREIGN PATENT DOCUMENTS

EP 1431705 A1 6/2004

(Continued)

*Primary Examiner* — Mary Cheung
*Assistant Examiner* — Michael D Lang
(74) *Attorney, Agent, or Firm* — Maschoff Gilmore & Israelsen

(57) ABSTRACT

The invention relates to a method and a system for the high-precision positioning of at least one object in a final location in space. An object (12) is gripped and held by the industrial robot (11) within a gripping tolerance. A compensating variable, which corrects the gripping tolerance, is determined for the industrial robot (11). The object (12) is adjusted with high precision into a final location by the following steps, which repeat until reaching the final location at a predetermined tolerance: recording of image recordings by recording units ($1_a$, $1_b$); determining the current location of the object (12) in the spatial coordinate system from the positions ($P_a$, $P_b$) of the recording units ($1_a$, $1_b$), the angular orientations of cameras ($2_a$, $2_b$) of the recording units ($1_a$, $1_b$) which are detected by angle measuring units ($4_a$, $4_b$), the image recordings, and the knowledge of features (13) on the object (12); calculating the location difference between the current location of the object (12) and the final location; calculating a new target position of the industrial robot (11) in consideration of the compensating variable from the current position of the industrial robot (11) and a variable which is linked to the location difference; adjusting the industrial robot (11) into the new target position.

40 Claims, 5 Drawing Sheets

U.S. PATENT DOCUMENTS

| | | |
|---|---|---|
| 5,706,408 A | 1/1998 | Pryor |
| 6,236,896 B1* | 5/2001 | Watanabe et al. ............... 700/37 |
| 6,584,378 B1* | 6/2003 | Anfindsen ..................... 700/245 |
| 8,095,237 B2* | 1/2012 | Habibi et al. ................ 700/245 |
| 2004/0243282 A1* | 12/2004 | Watanabe et al. ............ 700/259 |
| 2008/0154430 A1* | 6/2008 | Nakamura et al. ............ 700/259 |

FOREIGN PATENT DOCUMENTS

| | | |
|---|---|---|
| JP | 2003-117861 | 4/2003 |
| WO | 2007/004983 A1 | 1/2007 |

* cited by examiner

METHOD AND SYSTEM FOR THE HIGH-PRECISION POSITIONING OF AT LEAST ONE OBJECT IN A FINAL LOCATION IN SPACE

The invention relates to a method for the high-precision positioning of at least one object having known optically detectable features in a final location in space by means of an industrial robot and to at least two optical recording means and also to corresponding systems for carrying out this method. Methods and systems of this type are used in particular in assembly and production processes in automated production lines, for example in the automotive industry, in which an object, for example a sheet metal or other bodywork part, is to be brought by means of an industrial robot with high precision into a determined position and orientation in space for carrying out an operation.

BACKGROUND

The handling systems known in the art, in particular industrial robots, for example articulated arm robots, for positioning an object gripped by means of a gripping device in a determined position and orientation in space, have internal measuring systems which can detect the position of the members of the handling system and thus provide information about the position and orientation of the gripping device in space. A distinction must be drawn in this regard between axis-related and space-related coordinate systems. The axis-related coordinate systems each relate to an axis of the robot and the respective position thereof. The kinematic chain of the individual axes and members of the robot and the respective positions thereof produces the unique location (position and orientation) of the robot tool, i.e. the gripping device, at the end of the kinematic chain. However, the location of the gripping device of an industrial robot is preferably described in a space-related manner via what is known as the TCP, the tool centre point. This is an imaginary reference point located at a suitable point on the robot tool. In order to describe what location the robot tool is to assume, the position of the TCP in space and the rotation thereof are defined. In particular by means of what is known as the Denavit-Hartenberg transformation, the robot controller is used to calculate which position the individual robot axes must assume, so that the robot tool assumes the predefined location. The location of the gripping device with its TCP preferably relates to the world coordinate system, the space coordinate system or the cell coordinate system which is for example directly or indirectly related to the base of the first axis, the base axis, the base frame or the robot base of the robot and is coupled thereto. The remaining subcoordinate systems are related to this world coordinate system, space coordinate system or cell coordinate system. It goes without saying that this world coordinate system, space coordinate system or cell coordinate system does not have to be an absolute world system; on the contrary, this system can also be subordinate to another system. The coordinate system is therefore a system which forms the superordinate reference system within the process. This system is usually coupled to the floor of the process hall, the process space or the process cell.

It is thus possible to adjust the gripping device, including the gripped object, into a determined predefined position by appropriate input on the robot controller. The gripped object is therefore positioned in space by predefining a position of the gripping device. However, this gives rise in particular to the following two problems.

On the one hand, the measuring system of conventional industrial robots which are designed for holding heavy objects is not so precise as to allow the gripping device to assume such a precise position as is required in certain production methods. The drives of industrial robots are sufficiently precise, but the measuring systems thereof are not. The measuring errors of the individual measuring members are multiplied through the kinematic chain. This results both from the measuring accuracy of the individual measuring members, in particular the angle measuring means of an articulated arm robot, and from the inevitable elasticity of the robot members.

On the other hand, the position of the gripping device and thus the location thereof in space does not yet necessarily produce the location of the object in space, as the object can usually be gripped only within a gripping tolerance. In many cases, this gripping tolerance is well above the required positioning accuracy. Thus, the gripping error, i.e. the location of the object relative to the gripping device, likewise has to be taken into consideration. Separate measuring systems which no longer pertain to the robot, in particular contactless optical measuring systems, are used for this purpose. Only these allow the object in space to be positioned in a determined location with the required accuracy.

A method for the welding-together of workpieces, in particular pressed sheet metal parts or composite metal sheets, is known from WO 2007/004983 A1 (Pettersson). The workpieces to be joined together are held by industrial robots and positioned thereby relative to one another for mutual welded connection. During the production of the welded connection, the workpieces are held by the industrial robots in the respective locations, so that the location of the parts relative to one another is maintained. The welding is carried out for example by means of a welding robot. A measuring system measures the positions of the workpieces in order to allow the workpieces to be positioned before the welding process. The measuring is carried out in particular continuously during the welding process. The described method allows the otherwise conventional, workpiece-specific moulds and workpiece receptacles, into which the workpieces have to be fixed prior to welding, which moulds and receptacles are complex to produce, to be dispensed with. The industrial robots can be used universally for differently shaped and configured workpieces, as identifying and monitoring of the workpieces and also accurate positioning of the parts relative to one another are possible as a result of the detection of the position of the workpieces by means of the measuring system. Thus, a single system can be used for different workpieces. There is therefore no need to change workpiece receptacles. According to the disclosure, the described method is suitable in particular for the welding of sheet metal parts, above all in the automotive industry. The example given of a possible measuring system is generally a laser triangulation method in which predefined points on the workpiece are measured. For this purpose, reflectors are for example attached to the workpiece. According to the description, the position of each reflector can be determined by means of a light source and a two-dimensional detector, so that the position and orientation of the workpiece can be detected by means of three such points. The precise construction of the measuring system is not described in greater detail in WO 2007/004983 A1.

U.S. Pat. No. 5,380,978 (Pryor) describes a method for positioning objects, in particular sheet metal parts, in space by means of an industrial robot. The measuring system used is in the form inter alia of cameras having an appropriate stereo base for the three-dimensional detection of the location of the object in space. The cameras are embodied in a pivotable manner, for adjusting the field of vision, and in a specific embodiment as a theodolite camera which can also have a laser distance measuring means. The described theodolite serves in this case as a precise adjusting device for the camera. Similar measuring systems are also described in U.S. Pat. No. 4,851,905 (Pryor) and U.S. Pat. No. 5,706,408 (Pryor).

A common feature of these systems and methods is the fact that the positions of a plurality of marked points on the object are determined by means of contactless photogrammetric coordinate measurements with the aid of image-processing systems.

For the contactless photogrammetric measurement of coordinates at the surface of an object in the near range, the dimensions of the object and the location thereof relative to further objects in the image is concluded from images representing the object from various perspectives, by transformation of the image data into an object coordinate system within which the object is to be measured and which is based for example on the CAD model of the object. For this purpose, the image data are processed in a data processing unit. The basis of the calculation of the coordinates is the determination of the relative camera orientations of the images involved.

It is in this case possible, as is known in the art, to record in a temporally offset manner from various perspectives the area portion to be measured of the surface of the object by means of a single camera and subsequently to process the respectively two-dimensional image data into what is known as a three-dimensional image by means of an image processing system. In this case, depth information is respectively associated with the pixels of this three-dimensional image, so that 3D image coordinates in an image coordinate system determined from the cameras and the perspectives thereof are associated with each pixel to be examined, in particular all the pixels. Different image processing methods for generating a three-dimensional image of this type from a plurality of two-dimensional images showing the same scene from different perspectives are known in the art.

It is also possible, as is likewise known in the art, to carry out, instead of the temporally offset recording of the area portion from different perspectives by means of a camera, a substantially simultaneous recording with the aid of a plurality of cameras. This has the dual advantage that three-dimensional detection of the area portion is possible without moving the camera and that detection of the respective camera orientations is dispensed with, as the cameras can have a fixed relative orientation to and distance from one another.

Different 3D image recording means which are composed substantially of two or three cameras, which are accommodated so as to be set apart from one another, i.e. having a stereo base, in a common housing so as to be securely coupled to one another for recording a scene from an in each case different, but fixed relative perspective, are known in the art. As the recorded area portion does not necessarily have characteristic image features allowing the images to be electronically processed, markings can be applied to the area portion. These markings can be produced by means of a structured light beam, in particular a laser beam, which is projected from the 3D image recording unit onto the area portion and projects for example an optical grating or an optical marking cross. In many cases, 3D image recording units of this type also contain an image processing means which derives a three-dimensional image from the plurality of images, recorded substantially at the same time, of different perspectives.

Examples of 3D image recording units of this type are the image recording systems known under the brand names "Optigo" and "OptiCell" from the company "CogniTens", which contain three cameras arranged in an isosceles triangle, and also the "Advent" system from the company "ActiCM" with two high-resolution CCD cameras arranged next to each other and also a projector for projecting structured light onto the portion to be recorded.

The coordinates of recorded image elements to be measured are generally determined by means of referenced markings within the image, from which markings the actual 3D coordinate measurement takes place. In this case, the image coordinate system, which relates to the recorded three-dimensional image and is thus related to the 3D image recording unit, is transformed into the object coordinate system within which the object is to be measured and which is based for example on the CAD model of the object. The transformation takes place on the basis of recorded reference markings, the positions of which in the object coordinate system are known. Accuracies of less than 0.5 millimeter are achieved in this case with the 3D image recording units known in the art.

3D scanning systems, in particular in the form of 3D laser scanners, which carry out a depth scan within an area region and generate a point cloud, are also known. In this case, a distinction must be drawn between serial systems, in which a laser beam scans an area line by line, parallel systems, in which a scan line is fanned out over an area, and fully parallel systems, what are known as RIMs or range imaging systems, which simultaneously scan a large number of points within an area region and thus carry out a depth recording of the area region. A common feature of all these systems is generally the fact that the depth scanning takes place by means of at least one distance measuring laser beam which is in particular moved over the area. In particular serial systems of this type are widespread and commercially available for example under the product names "Leica HDS 6000", "Leica ScanStation 2", "Trimble GX 3D Scanner", "Zoller+Fröhlich IMAGER 5003" and "Zoller+Fröhlich IMAGER 5006".

A problem of each 3D image recording unit is the recording range within which it is possible to record images with the required resolution, this range being limited due to the design. In the three-dimensional detection of relatively large objects, it is therefore inevitable to make a plurality of individual three-dimensional recordings from different positions and orientations of the 3D image recording unit. This large number of smaller image recordings are subsequently joined together to form a larger three-dimensional total image by means of compensation of overlapping image regions and with the aid of markings within the recorded area portion. Different methods for achieving this object are known in the art. A general problem with these methods consists in the fact that the individual three-dimensional images which are to be joined together to form a larger image have to have a region of overlap. The image-processing systems do not allow the position of the 3D image recording unit to be discretely varied from a first area portion having at least one reference point to a second area portion which is set apart from the first area portion and does not contain any reference points, if no further images connecting the two area portions were recorded. It is therefore necessary to carry out a large number of intermediate image recordings in order to optically connect the two set-apart area portions to be measured and to allow coherent image processing. The recording of a large number of three-dimensional images having no direct measuring content slows down the measuring method as a whole and uses up memory and computing resources. Furthermore, the coordinate measurements, which inevitably contain minor measuring errors, within the image recording have a drastic effect on measuring accuracy during the composition of the large number of images, in particular in the case of remote reference points.

The use of a large number of reference points having known positions in the object coordinate system is thus inevitable on account of the limited field of vision of the cameras. An advantage of the purely photogrammetric systems described consists in the fact that the absolute position and orientation of the individual cameras of the 3D image recording unit in the object coordinate system does not have to be determined, since the absolute position of the recorded pixels is determined from the knowledge of the position of the likewise recorded reference points in the image, the orientation of the cameras relative to one another and also the relative positions, calculated via triangulation, of the points to be measured relative to the reference points in the image. The measuring system may thus be limited to image-calibrated cameras, the position of which relative to one another is known, and an image processing means.

A drawback of all these systems consists in the fact that an adjustment of the field of vision, by either pivoting or varying the position of the cameras or the object to be measured, is often inevitable on account of the limited field of vision of the cameras and the limited image resolution. This is the case above all when measuring relatively large objects to be measured with high precision, as a determined distance of the cameras from the object may not be exceeded, on account of the limited image resolution, in order to adhere to the required measuring accuracy, although the field of vision of the camera allows only a part of the object to be recorded at such proximity to the object. It is thus necessary either to use a large number of reference points, so that in each image recording a corresponding number of reference points, preferably at least three reference points, lies in the field of vision, or to draw on the positions of object points which have already been determined beforehand, in particular markings on the object.

In this case, a plurality of individual three-dimensional recordings are, as described above, made from different positions and orientations of the 3D image recording unit. This large number of smaller image recordings are subsequently joined together to form a larger three-dimensional total image by means of compensation of overlapping image regions and with the aid of markings within the recorded area portion. This is time-consuming and requires the use of markings which cannot be measured per se.

Also known in the art are measuring systems and methods in which the 3D image recording unit is carried by the head of an industrial robot or a gantry coordinate measuring machine and is adjustable. Precise detection of the position of the 3D image recording unit at the required accuracy, which is equivalent to the image recording accuracy, is not possible on account of the high weight of a high-quality and high-resolution 3D image recording unit, which is in some cases more than 10 kilograms, as this would require such a stable construction of the handling system that the range of use of the 3D image recording unit would be limited to stationary systems. Industrial robots are unsuitable for external referencing on account of their comparatively low measuring accuracy which is much lower than that of a precise 3D image recording unit. Gantry coordinate measuring machines are, for their part, not designed for carrying heavy loads and, under high mechanical loading, do not provide any measured results which can be used for referencing. For this reason, the product measured values, which may be supplied by the handling system and might provide information about the absolute and/or relative position of the 3D image recording unit, cannot be adduced for referencing the image recordings, in particular a plurality of three-dimensional image recordings of different, non-coherent area portions.

Although the described measuring systems are also suitable for the high-precision positioning of objects in space by means of handling systems and are also used for this purpose, the systems known previously in the art have numerous drawbacks. On account of the above-described measuring method, which takes place substantially purely via image processing, the methods are relatively time-consuming and require the detection of reference or auxiliary markings which cannot be measured per se. On account of the limited field of vision of the cameras, the 3D image recording units are arranged usually in direct process proximity, generally on a robot arm or at a short distance from the object. Owing to the process proximity associated therewith, the 3D imaging unit is exposed to any particles and thermal influences produced by the process—for example during welding. Likewise on account of the process proximity, further handling systems have to be adapted to the handling system of the 3D image recording unit in order to avoid collisions. Moving the 3D image recording unit and the new referencing associated therewith are comparatively time-consuming and slow down the process sequence as a whole. As three-dimensional image detection requires the relative location of the plurality of cameras to be known at all times, independent orientation of the cameras is avoided. Instead, the cameras are preferably mechanically coupled to one another. As process-remote positioning of the 3D image recording unit requires the cameras to be set correspondingly far apart from one another in order to allow a sufficient stereo base for three-dimensional image detection, the cameras can in this case no longer be mechanically coupled. In the past, a process-remote arrangement of the 3D image recording unit has thus been dispensed with altogether. The two objectives, on the one hand a high-precision, contactless 3D measuring system having an accuracy of preferably less than 0.1 millimeter for the high-precision positioning of objects by means of industrial robots and on the other hand a measuring system which is not directly exposed to the process, can be handled in a flexible manner and can in particular be freely positioned, are thus a conflict of objectives that has not yet been sufficiently solved in the field of the industrial positioning of objects by means of industrial robots.

SUMMARY

The object of the invention is therefore to provide a method distinguished by flexibility, precision and high process speed and a corresponding system for the high-precision positioning of at least one object in a location in space by means of an industrial robot.

This object is achieved by the realisation of the features of the independent claims. Features developing the invention in an alternative or advantageous manner may be inferred from the dependent patent claims.

The method according to the invention will firstly be described in general terms. Possible and preferred developments of the invention will subsequently be commented on in general terms with the aid of the figures which show schematically illustrated exemplary embodiments.

The method for the high-precision positioning of at least one object in a final location in space is carried out by means of an industrial robot, a first optical recording means and at least one second optical recording means. The first industrial robot can be adjusted into predefinable positions. It is internally calibrated and also calibrated in the three-dimensional space coordinate system and related thereto. The first optical recording means, which is calibrated in a three-dimensional space coordinate system and is positioned in a known first position having a known orientation, comprises an optically calibrated first camera for recording images within a determined first field of vision, a first drive unit for orienting the first camera—causing an adjustment of the first field of vision—and a first angle measuring unit, which is calibrated in the space coordinate system, for the high-precision detection of the angular orientation of the first camera, so that the first field of vision can be determined in the space coordinate system. The at least one second optical recording means, which is calibrated in the three-dimensional space coordinate system and positioned in a known second position having a known orientation, comprises an optically calibrated second camera for recording images within a determined second field of vision, a second drive unit for orienting the second camera—causing an adjustment of the second field of vision—and a second angle measuring unit, which is calibrated in the space coordinate system, for the high-precision detection of the angular orientation of the second camera, so that the second field of vision can be determined in the space coordinate system. The at least two positions, i.e. those of the first and the second recording means, are set apart in such a way as to allow a three-dimensional image recording of the at least one object by means of the at least two recording means through at least partly overlapping fields of vision.

The method includes the following steps:

A first object, which has known optically detectable first features, is gripped and held by the first industrial robot within a gripping tolerance.

A first compensating variable of this type, which corrects the gripping tolerance, is determined for the first industrial robot, so that the first object is adjustable in a compensated manner in the space coordinate system by predefining a position of the first industrial robot. The first compensating variable being determined in this way by the following steps:

Orienting the at least two cameras, in each case by means of the drive unit with at least partly overlapping fields of vision of the cameras, onto at least a part of the first features of the first object which is held in a first compensating position of the first industrial robot. Recording first image recordings by means of the two cameras. Determining the location of the first object in the space coordinate system in the first compensating position of the first industrial robot from the positions of the recording means, the angular orientations of the cameras, the angular orientations being detected by the angle measuring units, the first image recordings and the knowledge of the first features on the first object. Determining the first compensating variable by adducing the first compensating position of the first industrial robot and at least the determined location of the first object in the first compensating position of the first industrial robot.

The first object is adjusted with high precision into a first final location by the following steps, which are repeated until the first final location is reached at a predefined tolerance: Recording further first image recordings using the cameras. Determining the current location of the first object in the space coordinate system from the positions of the recording means, the angular orientations of the cameras, the angular orientations being detected by the angle measuring units, the further first image recordings and the knowledge of the first features on the first object. Calculating the location difference between the current location of the first object and the first final location. Calculating a new setpoint position of the first industrial robot in consideration of the first compensating variable from the current position of the first industrial robot and a variable linked to the location difference, and adjusting the first industrial robot into the new setpoint position.

The system according to the invention for the high-precision positioning of at least one object in a final location in space by means of an industrial robot comprises a first industrial robot, a first optical recording means, at least one second optical recording means and a control device. The first industrial robot is calibrated in such a way that it can be adjusted into predefinable positions. For this purpose, the industrial robot is internally calibrated and related to the space coordinate system. The first optical recording means, which is calibrated in a three-dimensional space coordinate system and positioned in a known first position having a known orientation, has an optically calibrated first camera for recording images within a determined first field of vision, a first drive unit for orienting the first camera—causing an adjustment of the first field of vision—and a first angle measuring unit, which is calibrated in the space coordinate system, for the high-precision detection of the angular orientation of the first camera, so that the first field of vision can be determined in the space coordinate system. The at least one second optical recording means, which is calibrated in the three-dimensional space coordinate system and positioned in a known second position having a known orientation, has an optically calibrated second camera for recording images within a determined second field of vision, a second drive unit for orienting the second camera—causing an adjustment of the second field of vision—and a second angle measuring unit, which is calibrated in the space coordinate system, for the high-precision detection of the angular orientation of the second camera, so that the second field of vision can be determined in the space coordinate system. The at least two positions of the first and second recording means are set apart in such a way as to allow a three-dimensional image recording of the at least one object by means of the at least two recording means through at least partly overlapping fields of vision. The control device has a data processing means embodied for image processing. The control device is data-connected to the first industrial robot and the at least two optical recording means in such a way that the image recordings recorded by the cameras are supplied to the control device, the angular orientations of the cameras that are detected by the angle measuring units are supplied to the control device, the drive units are activated by means of the control device for orienting the cameras and the first industrial robot is adjusted into positions which are predefined by the control device.

The control device and the data processing means thereof are embodied in such a way and are data-connected to the aforementioned components in such a way that the following steps are carried out by signal recording, signal evaluation, signal calculation and signal output:

A first object, which has optically detectable first features known to the control device, is gripped and held by the first industrial robot within a gripping tolerance.

A first compensating variable of this type, which corrects the gripping tolerance, is determined for the first industrial robot by the control device, so that the first object is adjustable in a compensated manner in the space coordinate system by predefining a position of the first industrial robot. This first compensating variable is determined by means of the control device by the steps of: Orienting the at least two cameras, in each case by means of the drive unit with at least partly overlapping fields of vision, onto at least a part of the first features of the first object which is held in a first compensating position of the first industrial robot. Recording first image recordings by means of the cameras. Determining the location of the first object in the space coordinate system in the first compensating position of the first industrial robot from the positions of the recording means, the angular orientations of the cameras, the angular orientations being detected by the angle measuring units, the first image recordings and the knowledge of the first features on the first object. Determining the first compensating variable by adducing the first compensating position of the first industrial robot and at least the determined location of the first object in the first compensating position of the first industrial robot.

The first object is adjusted with high precision by the control device into a first final location by the steps, which are repeated until the first final location is reached at a predefined tolerance: Recording further first image recordings by the cameras. Determining the current location of the first object in the space coordinate system from the positions of the recording means, the angular orientations of the cameras, the angular orientations being detected by the angle measuring units, the further first image recordings and the knowledge of the first features on the first object. Calculating the location difference between the current location of the first object and the first final location. Calculating a new setpoint position of the first industrial robot in consideration of the first compensating variable from the current position of the first industrial robot and a variable linked to the location difference. Adjusting the first industrial robot into the new setpoint position.

BRIEF DESCRIPTION OF THE DRAWINGS

The method according to the invention and the system will be described hereinafter based on schematically illustrated exemplary embodiments.

In the individual drawings.

DETAILED DESCRIPTION

Figure 1A:
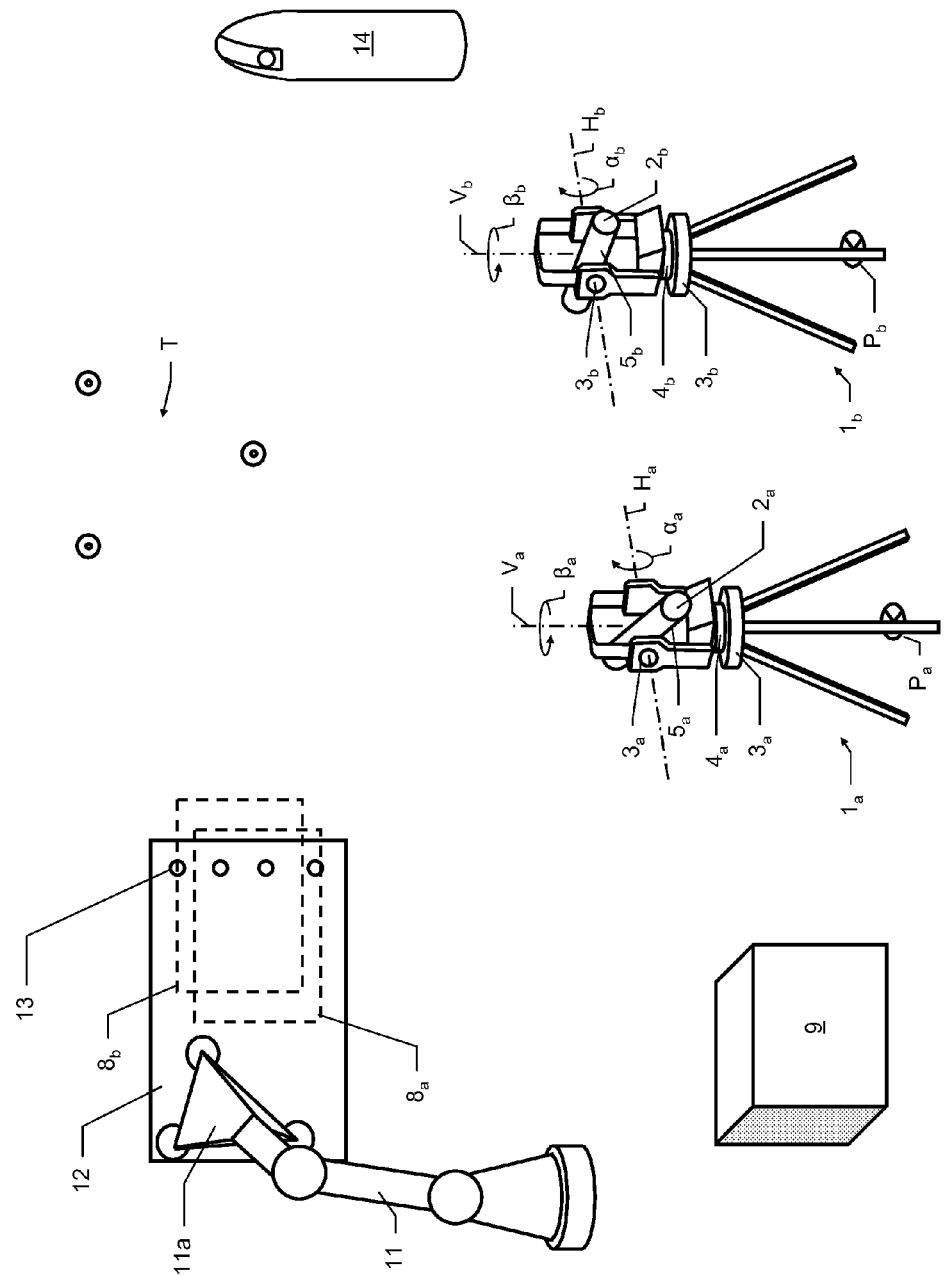
FIG. 1a shows the method and system according to the invention with two recording means for positioning a first object.
Figure 1B:
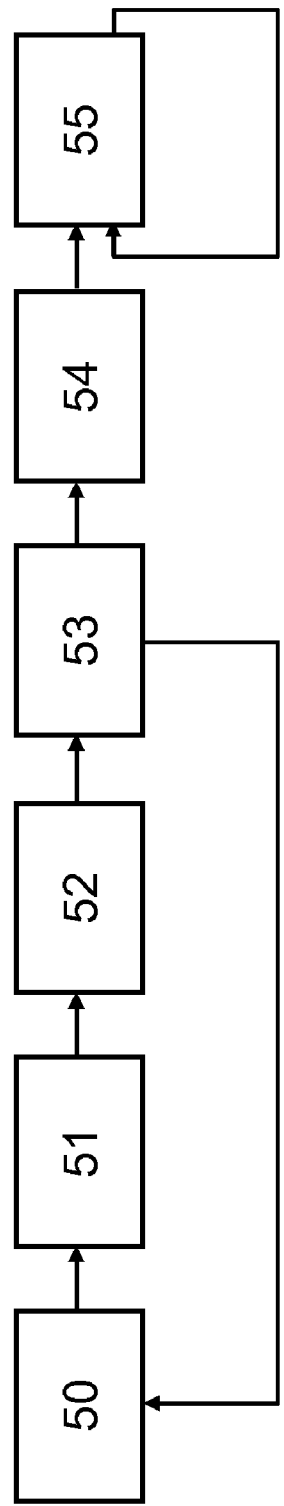
FIG. 1b is a flow chart of the sequence of the method.

FIG. 1a shows a first embodiment of the system and method sequence for the high-precision positioning of a first object in a first final location in space. The method steps are illustrated in FIG. 1b. FIGS. 1a and 1b will be commented on in conjunction with each other.

The method according to the invention is used for the high-precision positioning of at least one object in a final location in space by means of at least one industrial robot. The final location in space is a position and orientation that the object has to assume with high precision—in particular with an accuracy of less than 0.5 millimeter, preferably less than 0.2 millimeter, in particular less than 0.1 millimeter. The term "final location" is generally understood to refer to that position and orientation of the object into which the object is to be brought within the scope of the method. It goes without saying that the object can subsequently be brought into one or any desired number of further, new final locations.

The method components comprise a first industrial robot 11, a first optical recording means $1_a$ and at least one second optical recording means $1_b$. A control device 9 is furthermore provided for carrying out the method by means of the system.

The first industrial robot 11 is embodied for gripping a first object 12. For example, the industrial robot 11 is an articulated arm robot with a gripper 11a which is adjustable within six degrees of freedom. The gripper 11a is embodied as a pneumatic gripper, for example for gripping a piece of sheet metal. However, the gripper may also be a mechanical gripper, in particular a tong gripper, or another type of gripper for mechanically coupling an adjustable member of the industrial robot 11. The gripper 11a can be adjusted into predefinable positions in that a setpoint position of the gripper 11a is predefined for the industrial robot 11. For this purpose, the industrial robot 11 has internal measuring, automatic control and coordinate transformation systems. The term "an industrial robot" 11 generally refers to a handling system, as described at the outset, which is suitable for gripping and positioning an object.

The first optical recording means $1_a$ and also the second optical recording means $1_b$ are calibrated in a three-dimensional space coordinate system and positioned in a known first position $P_a$ and second position $P_b$ respectively each having a known orientation. Both the position and the angular orientation indirectly or directly in that coordinate system in which the first object 12 is also to be positioned are thus known in each case. The optical recording means $1_a$ and $1_b$ are calibrated in this space coordinate system. They each have an optically calibrated camera, namely a first camera $2_a$ and a second camera $2_b$, for recording images in each case within a determined field of vision $8_a$ or $8_b$, so that optical measurements can take place in the recording of images within the respective field of vision $8_a$ or $8_b$.

For the sake of simplicity, the recording means $1_a$ and $1_b$, which are identical in the exemplary embodiment, will be described in conjunction with each other, the index "a" relating to the first recording means $1_a$ and the index "b" relating to the second recording means $1_b$.

The term "a camera" refers generally to an electronic device for recording optically detectable points, the cameras $2_a$ and $2_b$ each having the required equipment for this purpose, in particular a lens and corresponding image recording elements, in particular a CCD or CMOS image sensor and corresponding electronics. The lens may be any desired lens, for example a fixed-focus lens, a zoom lens or a variable lens, in particular with motor zoom and autofocus. The cameras are internally calibrated, so that any errors, in particular in the optics, the image sensors or the electronics, for example distortions, etc. can be taken into consideration and compensated. The cameras are thus suitable for photogrammetric measurement. Furthermore, the optical recording means $1_a$ and $1_b$ each have at least one drive unit $3_a$ and $3_b$ respectively for orienting the respective cameras $2_a$ and $2_b$—causing an adjustment of the respective field of vision $8_a$ or $8_b$ of the cameras $2_a$ and $2_b$. For example, the respective drive unit $3_a$ or $3_b$ is a pivot unit for pivoting the camera $2_a$ or $2_b$ about two pivot axes. In a possible but not necessary variant embodiment, these pivot axes may each be a tilt axis $H_a$ or $H_b$, which is horizontal in relation to the space coordinate system, and a vertical standing axis $V_a$ or $V_b$.

Furthermore, the optical recording means $1_a$ and $1_b$ each have an angle measuring unit $4_a$ or $4_b$, which is calibrated in the space coordinate system, for the high-precision detection of the angular orientation of the respective cameras $2_a$ and $2_b$, so that the respective field of vision $8_a$ or $8_b$ can be determined in the space coordinate system. On account of the inner calibration, which relates to the camera and the angle measuring unit, of the two recording means $1_a$ and $1_b$ and also the outer referencing of the respective optical recording means $1_a$ or $1_b$ in the space coordinate system, each pixel defines with high precision in the space coordinate system a straight line resulting firstly from the location of the pixel on the image sensor, i.e. the image recording, secondly from the orientation of the respective camera $2_a$ or $2_b$, the orientation being detected by means of the respective angle measuring unit $4_a$ or $4_b$, and thirdly the known position of the respective optical measuring means $1_a$ or $1_b$ and also fourthly the respective calibration parameters.

In the exemplary embodiment shown, the angle measuring units $4_a$ and $4_b$ each detect the horizontal angular orientation $\alpha_a$ or $\alpha_b$ about the standing axis $V_a$ or $V_b$ and the vertical angular orientation $\beta_a$ and $\beta_b$ about the tilt axis $H_a$ and $H_b$ in the space coordinate system. The horizontal tilt axis $H_a$ or $H_b$ and the vertical standing axis $V_a$ or $V_b$ substantially intersect. Thus, the at least two recording means $1_a$ and $1_b$ are each embodied as a type of video theodolite, this referring to a theodolite with a camera which either is coaxially incorporated into the theodolite or is arranged non-coaxially, in particular on the telescope of the theodolite.

The positions $P_a$ and $P_b$ and outer calibration parameters of the recording means $1_a$ and $1_b$ can be determined by referenced external measuring systems, for example optical measuring systems such as a laser tracker 14, which determine the respective position of the recording means $1_a$ and $1_b$ in space. This can take place by target marks attached to the recording means $1_a$ and $1_b$. The external calibration of the orientations can also take place by means of external measuring systems. Furthermore, it is possible to position, in particular by means of positive centrings, the recording means $1_a$ and $1_b$ on reference points, the positions of which are known with high precision in the space coordinate system. Alternatively, it is possible for the recording means $1_a$ and $1_b$ to be referenced and calibrated in space by means of their own measuring systems. For this purpose, the recording means $1_a$ and $1_b$ each have a laser distance measuring sensor $5_a$ and $5_b$ which is orientable in conjunction with the respective camera $2_a$ or $2_b$ by means of the respective drive unit $3_a$ or $3_b$ and the angular orientation of which can be detected with high precision by means of the respective angle measuring unit $4_a$ or $4_b$ which is calibrated in the space coordinate system. In other words, the recording means $1_a$ and $1_b$ are each video tacheometers, i.e. theodolites with laser distance measuring means, with very high-resolution cameras. It goes without saying that it is possible to use other suitable pivoting and measuring devices for orienting the cameras and exactly detecting the orientations. However, it should be noted that a theodolite, a tacheometer or what is known as a total station are predestined for use on account of the angle measuring accuracy.

The positions $P_a$ and $P_b$ of the respective recording means $1_a$ or $1_b$ in the space coordinate system are determined by targets on stationary target marks T by means of the respective laser distance measuring means $5_a$ or $5_b$. Alternatively or additionally, the self-referencing via triangulation can take place by recording images of the stationary target marks and image processing.

The first position $P_a$ and the second position $P_b$ are set apart in such a way and the optical recording means $1_a$ and $1_b$ respectively are embodied in such a way as to allow a three-dimensional image recording of the at least one object by means of the at least two recording means $1_a$ and $1_b$ through at least partly overlapping fields of vision $8_a$ and $8_b$. In other words, the stereo base is such as to allow a three-dimensional image containing an item of depth information associated with the pixels to be recorded with the required accuracy. The obtaining of an item of depth information of two electronic images, recorded from different perspectives, by means of image processing is known in the art and does not need to be commented on in greater detail at this point.

The control device 9 has a data processing means embodied for image processing. The control device 9 is data-connected at least to the first industrial robot 11 and the at least two optical recording means $1_a$ and $1_b$. The image recordings recorded by the cameras $2_a$ and $2_b$ are supplied to the control device 9 for carrying out the image processing and obtaining the depth information. Furthermore, the control device 9 receives the angular orientations of the cameras $2_a$ and $2_b$, the angular orientations being detected by the angle measuring units $4_a$ and $4_b$, as an input signal. The drive units $3_a$ and $3_b$ are activated by means of the control device 9 for orienting the cameras $2_a$ and $2_b$. The first industrial robot 11 can be adjusted into positions which are predefined by the control device 9. The data connection required for this purpose can take place by means of voltage signals, radio signals, optical signals or other communication paths. The reference and calibration parameters, in particular the individual positions, orientations and dimensions of the components involved are—in so far as they are required for carrying out the method—stored in the control device 9. The control device 9 may be a unit, for example a personal computer with suitable ports, and also a plurality of mutually communicating or networked, locationally separate individual components which are for example part of individual devices. In particular, it is possible for the control device 9, which is to be understood in an abstract sense, to be part of the optical recording units $1_a$ and $1_b$ and/or the first industrial robot 11.

The first object 12, which is to be positioned in the final location in space, has known optically detectable first features 13. These first features 13 may be any desired features which can be detected by means of the cameras $2_a$ and $2_b$ of the recording units $1_a$ and $1_b$. The term "optically detectable" therefore refers to detectability by the cameras $2_a$ and $2_b$ and not necessarily to visibility by the human eye.

The optically detectable features can be formed by features of the object, in particular the shape, surface course and surface composition thereof, for example corners, rims, bores, recesses and beads. Alternatively or additionally, the features can be attached to the object, for example in the form of adhesive or coloured markings. Preferably, the features extend in at least two dimensions, for example in the form of three points not lying on a straight line. The features are such that the position determinations thereof define the location, i.e. the position and orientation of the object in space, as uniquely as possible.

The object 12 is any desired object which can be positioned with high precision in space and can be gripped and held by the first industrial robot 11, for example a sheet metal part.

The sequence of the method according to the invention will be described hereinafter, reference being made to FIG. 1b which shows the method sequence in the form of a flow chart.

In step 50 the first object 12, which is for example in a storage position, is gripped and held by the first industrial robot 11, by means of the gripper 11a thereof, within a gripping tolerance. The gripping tolerance is greater than the tolerance within which the first object 12 is to be positioned in the final location. In particular pneumatic grippers without positive centring to the object do not allow high-precision gripping, so that the location of the object relative to the gripper has a tolerance which is to be compensated, i.e. to be corrected.

In the optional step 51, which takes place in a development of the invention, the first industrial robot 11, which holds the first object 12 with the unknown gripping error, is adjusted into a first compensating position for determining a first compensating variable. In this compensating position of the first industrial robot 11, the first object 12 is clearly visible to the two cameras $1_a$ and $1_b$ for three-dimensional image recording. Provided that this visibility is already ensured after gripping and the first object 12 is already in a position, this step 51 may also be dispensed with.

In the subsequent step 52 a first compensating variable is determined in order to correct this gripping tolerance. This first compensating variable, which corrects the gripping tolerance, for the first industrial robot 11 serves to make the first object 12 adjustable in a compensated manner in the space coordinate system by predefining a position of the first industrial robot 11. The term "a compensated adjustment" refers to the fact that the gripping error with which the part was gripped is corrected when predefining the position which the gripper 11a of the robot is to assume. The gripping error is therefore taken into consideration by way of a correction variable, the first compensating variable. The gripping error can take place in all 6 degrees of freedom, so that the compensating variable can adopt corresponding values, in particular in the form of a tensor. In the ideal case, i.e. on exact gripping of the first object by the gripper 11a, the compensating variable would be equal to zero.

The first compensating variable is determined by the following partial steps. Firstly, the at least two cameras $2_a$, $2_b$ are pivoted, in each case by means of the drive unit $3_a$, $3_b$ with at least partly overlapping fields of vision $8_a$, $8_b$, onto at least a part of the first features 13 of the first object 12 which is held in the first compensating position of the first industrial robot 11. Preferably, at least three points forming the first features 13 are located in the region of overlap of the fields of vision $8_a$, $8_b$. First image recordings are now recorded by means of the two cameras $2_a$, $2_b$. The location of the first object 12, which is held in the first compensating position of the first industrial robot 11, in the space coordinate system is subsequently determined from these image recordings. The location can be determined in this way as soon as the position of three marked points has been determined. The location of the first object 12 is on the one hand determined from the knowledge of the positions $P_a$, $P_b$ of the recording means $1_a$, $1_b$, the angular orientations of the cameras $2_a$, $2_b$, the angular orientations being detected by the angle measuring units $4_a$, $4_b$, and the first image recordings. This information in itself allows the position of individual detected points in the space coordinate system to be determined photogrammetrically, in particular by image processing in the control device 9. In order to derive the location of the object therefrom, the knowledge of the first features 13 on the first object 12 is also required in order to be able to infer the location of the first object in space from the first position or location of the first features 13. If, for example, it is known from an electronic model that and at which point a sheet metal part has specific bores, then the location of the object may be inferred from the location of these bores. The first compensating variable is now determined by adducing the first compensating position of the first industrial robot 11, from which the ideal location in error-free gripping is obtained, and at least the determined, i.e. actual location of the first object 12 in the first compensating position of the first industrial robot 11.

In a development of the invention, the features 13 of the object 11 are substantially known from a model which can be processed by the electronic data processing means of the control device 9. The model is an electronic model obtained by means of CAD. The features 13 in the model and/or in the image recordings are identified by means of an image processing which is carried out on the electronic data processing means and these features 13 from the model and also the features 13 from the image recordings are associated with one another. The location of the object 12 in the space coordinate system is determined from the detected position of the recorded features 13 in the space coordinate system and the associated features 13. Image processing and feature identification methods of this type are known in the art and do not require any further comment at this point.

As it is now known with which error the first object 12 was gripped and a corresponding first compensating variable was determined, it is now possible to position the first object 12 by means of the first industrial robot 11 within the limits of the measuring accuracy of the sensors of the first industrial robot 11. However, this measuring accuracy is not sufficient, presenting a further positioning problem to be solved.

For example, it is possible on account of production tolerances and ambient parameters for the first object 11, for example a sheet metal part, itself to be subject to a determined tolerance in dimensions and shape that is to be taken into consideration. For this reason, the invention provides in a development the taking-into-consideration of variations of the first object.

In a development of the invention according to the optional step 53, the location of the recorded features 13 relative to one another is determined and mutually compared with the relative location of the features which are substantially known from the above-mentioned model. In a variant of the invention, an error message is output on exceeding of a divergence between the relative location of the recorded features 13 and the relative location of the features substantially known from the model. In a development of the invention, in the case of the error message, the object 12 is exchanged for a new object 12, so that the method is continued with the step 50, as shown by way of example in FIG. 1b. Alternatively, the model is adapted to the detected object 12. Thus, it is possible for the model, which is obtained for example by means of CAD, to be adapted to the actual dimensions of the gripped object 12. In this case, this adapted model determines the final location to be assumed by the object 12 in the space coordinate system. If the final location is for example determined by a partial portion of the object 12, in particular a rim which the final location is to assume, then a deformation of the part is accordingly taken into consideration by adapting the model.

In the likewise optional step 54, the first industrial robot 11 is adjusted, in consideration of the first compensating variable, from the first compensating position into a position in which the first object 12 is positioned in a first approach location close to the first final location. This takes place in that a new position, in which the first object 12 is in the first approach location, is predefined as an input variable for the first industrial robot for which the first compensating position was previously predefined. The two cameras $2_a$, $2_b$ are oriented, in each case by means of the drive unit $3_a$, $3_b$ with at least partly overlapping fields of vision $8_a$, $8_b$, onto at least a part of the first features 13 of the first object 12 which is now positioned in the first approach location.

In step 55 the first object 12 is adjusted with high precision into the first final location. For this purpose, the following steps are repeated until the first final location is reached at a predefined tolerance. Firstly, further first image recordings are recorded by means of the cameras $2_a$ and $2_b$. The current location of the first object 12 in the space coordinate system is determined, again, from the positions $P_a$, $P_b$ of the recording means $1_a$, $1_b$, the angular orientations of the cameras $2_a$, $2_b$, the angular orientations being detected by the angle measuring units $4_a$, $4_b$, the further first image recordings and the knowledge of the first features 13 on the first object 12. The current location is now compared with the setpoint location, i.e. the first final location. The location difference between the current location of the first object 12 and the first final location is calculated. Subsequently, a new setpoint position of the first industrial robot 11 is calculated. This takes place in consideration of the first compensating variable from the current position of the first industrial robot 11 and a variable linked to the location difference. The variable linked to the location difference is preferably the location difference multiplied by a factor of less than or equal to 1. This means that the new setpoint position is a position of the industrial robot 11 in which the first object 12 will be in a location between the current location and the first final location. If the factor is equal to 1, the new setpoint position is a position in which the first object 12 is approximately brought from the current location to the first final location, in so far as this is possible by means of the less precise sensors and actuators of the industrial robot 11. However, as these sensors and actuators are often too inaccurate to bring the first object 12 up to the first final location by means of just one step 55 at the predefined tolerance, the factor is preferably less than 1, preferably less than 0.95, in particular less than 0.9, for example less than 0.8, but greater than 0. By means of a factor of less than 1 but greater than 0, the new setpoint position of the industrial robot 11 is such that, after the industrial robot 11 has been adjusted into the new setpoint position, the first object 12 has approached the first final location, but not yet quite reached it.

The first industrial robot 11 is subsequently adjusted by predefining the new setpoint position. In other words, the first industrial robot receives a new position input variable from which its new setpoint position is obtained. This new setpoint position is thus approached by means of the sensors and actuators of the first industrial robot 11. The aforementioned steps are subsequently repeated. Further first image recordings are therefore recorded again by means of the cameras $2_a$ and $2_b$; based on the further first image recordings, the current location of the first object 12 is determined and the location difference between the current location of the first object 12 and the first final location is calculated. If the first object, again, does not lie within the required tolerance of the first final location, a new setpoint position, which is calculated from the current position of the first industrial robot and the variable linked to the location difference in consideration of the first compensating variable, is again predefined for the first industrial robot 11. These steps are repeated until the first object 12 has reached the first final location with high precision within the tolerance.

A major advantage of the described method consists in the fact that the location of the object in space can be detected by means of a very small number of image recordings which have to display, apart from the features of the object, no further reference marks, thus speeding up the method considerably. After the field of vision of the cameras has been adjusted, the photogrammetric image evaluation can take place without new referencing. This is important in particular in industrial applications in which objects are moved by handling systems over relatively large distances and subsequently precisely positioned, as changing the field of vision, in the form of a pivoting of the cameras onto the features of the objects, requires neither renewed referencing nor the utilisation of previously measured images and/or reference markings. This ensures rapid, high-precision and procedurally safe positioning. Because the pivoting of the cameras does not lead to any loss of time on account of new referencing or coupling orientation, the recording means can be arranged so as to be remote from the process, in particular at a distance of 2 to 5 meters, so that the process is not impaired and the measuring technology is not directly exposed to the process.

This is advantageous in particular in welding methods, as the sensitive measuring technology is hardly influenced.

It goes without saying that it is possible to use further recording means for increasing the position determining accuracy. In this case, the three fields of vision of the three cameras intersect, for example.

In a possible variant, the at least two recording means $1_a$, $1_b$ are embodied in such a way that the horizontal tilt axis $H_a$ or $H_b$ and the vertical standing axis $V_a$ or $V_b$ substantially intersect and in particular the projection centre of the camera $2_a$ or $2_b$ is arranged in each case at the intersection of the horizontal tilt axis $H_a$ or $H_b$ and the vertical standing axis $V_a$, $V_b$. Thus, the position of the camera $2_a$ or $2_b$ is coupled, in each case independently of the angular orientation $\alpha_a$, $\beta_a$ or $\alpha_b$, $\beta_b$, to the position $P_a$ or $P_b$ of the recording means $1_a$ or $1_b$. In other words, in this case, the optical axis of the camera $2_a$ or $2_b$ intersects in each orientation the intersection of the horizontal tilt axis $H_a$ or $H_b$ and the vertical standing axis $V_a$ or $V_b$. The location in the space coordinate system is thus determined from the positions of the cameras $2_a$, $2_b$, the angular orientations $\alpha_a$, $\beta_a$; $\alpha_b$, $\beta_b$ of the cameras $2_a$ or $2_b$, the angular orientations being detected by the angle measuring units $4_a$, $4_b$, the image recordings and the knowledge of the features 13.

In another possible variant, the at least two recording means $1_a$, $1_b$ are each embodied in such a way that the projection centre of the camera $2_a$ or $2_b$ is arranged in each case outside the intersection of the horizontal tilt axis $H_a$ or $H_b$ and the vertical standing axis $V_a$ or $V_b$. In other words, the optical axis of the camera $2_a$ or $2_b$ does not intersect the intersection of the axes. The positions of the cameras $2_a$, $2_b$ are each determined from the predefined eccentricity of the projection centre of the camera $2_a$ or $2_b$ from the intersection, the angular orientations $\alpha_a$, $\beta_a$; $\alpha_b$, $\beta_b$ and the positions $P_a$, $P_b$ of the recording means $1_a$, $1_b$. The location in the space coordinate system is then determined from the positions $P_a$, $P_b$ of the recording means $1_a$, $1_b$, the eccentricities of the projection centres of the cameras $2_a$, $2_b$, the angular orientations of the cameras $2_a$, $2_b$, the angular orientations being detected by the angle measuring units $4_a$, $4_b$, the image recordings and the knowledge of the features 12.

Figure 2:
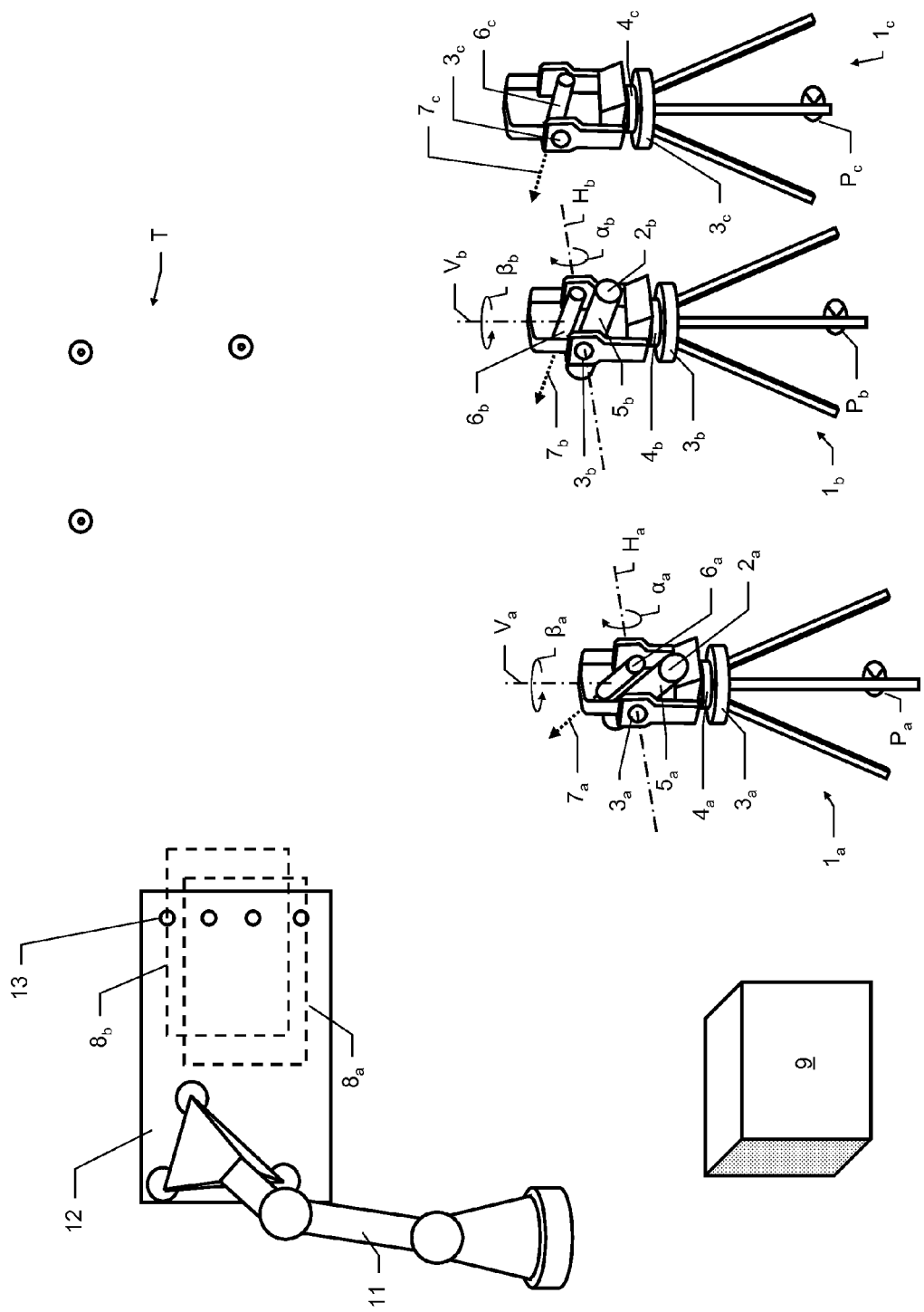
FIG. 2 shows the method and system with two recording means and an emission means for positioning a first object.

FIG. 2 shows a development of the invention, wherein the features which have already been commented on of the exemplary embodiment from FIG. 1a will not be re-examined.

In the exemplary embodiment of FIG. 2, the recording means $1_a$ have a first emitter $6_a$ which is embodied for emitting a first structured light $7_a$ within the first field of vision $8_a$ of the first camera $2_a$. The first emitter $6_a$ is orientable in conjunction with the first camera $2_a$ by means of the first drive unit $3_a$. The angular orientation can be detected with high precision by means of the first angle measuring unit $4_a$ which is calibrated in the space coordinate system. In the above-described step of the recording of the image recordings, the first structured light $7_a$ is projected from the first emitter $6_a$ onto the object 12 in such a way that the first structured light $7_a$ lies in the field of vision of the second camera $2_b$ of the second recording means $1_b$. In addition, the location of the object 12 in the space coordinate system is determined by means of triangulation from the positions $P_a$, $P_b$ of the recording means $1_a$, $1_b$, the angular orientations of the first emitter $6_a$ and the second camera $2_b$, the angular orientations being detected by the angle measuring units $4_a$, $4_b$, and the image recordings of the second camera $2_b$ that image the first structured light $7_a$. This allows the position determining accuracy to be increased. Furthermore, it is possible to carry out measurements even on a portion of an object that has no optically detectable markings.

The second recording means $1_b$ also has an emitter, namely the second emitter $6_b$, which is embodied for emitting a second structured light $7_b$ within the second field of vision $8_b$ of the second camera $2_b$. The second emitter is orientable in conjunction with the second camera $2_b$ by means of the second drive unit $3_b$. The angular orientation of the second emitter $6_b$ can be detected with high precision by means of the second angular measuring unit $4_b$ which is calibrated in the space coordinate system. In the above-described step of recording the image recordings, the second structured light $7b$ is projected from the second emitter $6_b$ onto at least the part of the features 13 of the object 12 in such a way that the second structured light $7_b$ lies in the field of vision of the first camera $2_a$ of the first recording means $1_a$. In addition, the location of the object 12 in the space coordinate system is determined by means of triangulation from the positions $P_a$, $P_b$ of the recording means $1_a$, $1_b$, the angular orientations of the second emitter $6_b$ and the first camera $2_a$, the angular orientations being detected by the angle measuring units $4_a$, $4_b$, and also the image recordings of the first camera $2_a$ that image the second structured light $7_b$ and the knowledge of the features 13 on the object 12.

Furthermore, an emission means $1_c$, which has a third emitter $6_c$, is arranged in a known third position $P_c$ and at a known orientation. This third emitter $6_c$ is embodied for emitting a third structured light $7_c$ and orientable by means of a third drive unit $3_c$. The angular orientation of the third emitter $6_c$ can be detected with high precision by means of a third angle measuring unit $4_c$ which is calibrated in the space coordinate system. In the above-described step of recording the image recordings, the third structured light $7_c$ is projected from the third emitter $6_c$ onto the object 12 in such a way that the third structured light $7_c$ lies in the field of vision of the first camera $2_a$ of the first recording means $1_a$ and/or the second camera $2_b$. In addition, the location of the object 12 in the space coordinate system is determined by means of triangulation from the position $P_a$ of the first recording means $1_a$, the angular orientation of the first camera $2_a$, the angular orientation being detected by the first angle measuring unit $4_a$, the angular orientation of the third emitter $6_c$, the angular orientation being detected by the third angle measuring unit $4_c$, and the image recordings of the first camera $2_a$ that image the third structured light $7_c$. An advantage of the use of the emission means $1_c$ consists in the fact that appropriate, in particular laterally offset, positioning provides an advantageous basis for triangulation allowing the measuring accuracy to be further increased when determining the location of the object.

It is possible to equip just a single recording means or a plurality of recording means with an emission unit. The respectively structured light $7a$, $7b$, $7c$ is for example a projected laser line, a laser spot which is projected so as to be fanned out in the form of a laser line or a two-dimensionally projected pattern, in particular a laser raster.

In the exemplary embodiment of FIG. 2, the two recording means $1_a$ and $1_b$ also have laser distance measuring means $5_a$ and $5_b$ respectively which are orientable in conjunction with the first camera $2_a$ or $2_b$ by means of the respective drive unit $3_a$ or $3_b$ and the angular orientations of which can be detected with high precision by means of the angle measuring unit $4_a$ or $4_b$ which is calibrated in the space coordinate system. These laser distance measuring means $5_a$ and $5_b$ respectively are likewise additionally adduced for determining the location of the object 12 in the space coordinate system with increased accuracy by aiming at the features 13 on the object 12. Furthermore, it is possible to determine the positions $P_a$ and $P_b$ of the recording means $1_a$ in the space coordinate system by aiming at stationary target marks T by means of the laser distance measuring means $5_a$ and/or $5_b$. Alternatively, the laser distance measuring means $5_a$ and $5_b$ respectively can be embodied as laser scanners measuring in particular over the entire field of vision of the respective camera. The laser distance measuring means $5_a$ and $5_b$ respectively may therefore also be additionally orientable in relation to the camera, wherein this orientation can be measured relative to the respective camera. As a result, the measuring beam is measurably orientable in relation to the respective camera.

The above-illustrated positioning method has been described for the free positioning of an individual first object in space. However, it is also possible to position at least one second object with the aid of the methods and components described hereinbefore and/or to orient with high precision the first object relative to the second object, and vice versa. Methods of this type will be described hereinafter. It is likewise feasible to combine the above-described features also with the positioning of the second object and any further object. However, for the sake of simplicity, the developments which are possible in the positioning of the first object will not also be described for the positioning of the further objects too. However, these combinations are also part of this invention.

Figure 3:
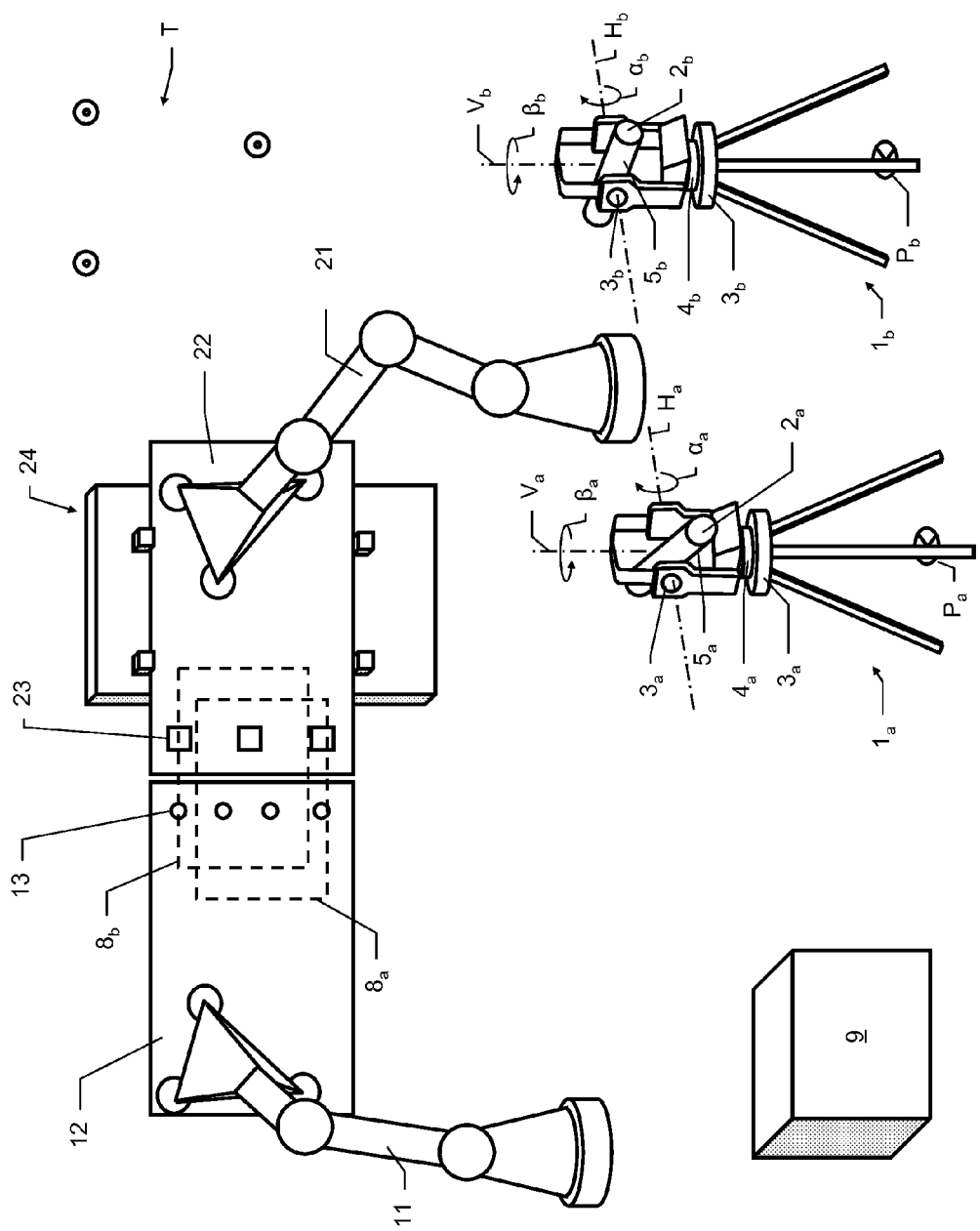
FIG. 3 shows the method and system with two industrial robots for positioning a first and second object.

FIG. 3 shows a combination of this type. In addition to the key components of the embodiment from FIG. 1a, which will not be re-examined here, a second industrial robot 21 and an object holder 24 are provided. Before the high-precision adjustment of the first object 12 into the first final location, as described above, a second object 22 is gripped by the second industrial robot 21 and placed into the object holder 24. The object holder 24 is embodied as what is known as a fixture which can accommodate the second object 22. For this purpose, it is possible for the object holder 24 to display an appropriate shape—for example to avoid a deformation of the object—and/or to have appropriate clamping devices for fixing the object. After the placement in the object holder 24, the second object 22 is in a second final location in the space coordinate system. Alternatively, it is possible to place the second object in the object holder 24 not by means of a second industrial robot 21 but rather by hand. In a variant embodiment, the object holder 24 is embodied in a positively centring manner in such a way that the second object 22 is placed with high precision in the predefined second final location. A detection of the second final location by means of measuring technology may in this case be dispensed with. However, if this is not the case, then the second final location is determined in the space coordinate system. For this purpose, the second object 22 has known optically detectable second features 23. After the second object 22 has been placed in the object holder 24, the second final location of the second object 22 in the space coordinate system is determined in that firstly the at least two cameras $2_a$, $2_b$ are oriented, in each case by means of the drive unit $3_a$, $3_b$ with at least partly overlapping fields of vision $8_a$, $8_b$, onto at least a part of the second features 23 of the second object 22. Second image recordings are recorded. The second final location of the second object 22 in the space coordinate system is now determined from the positions $P_a$, $P_b$ of the recording means $1_a$, $1_b$, the angular orientations of the cameras $2_a$, $2_b$, the angular orientations being detected by the angle measuring units $4_a$, $4_b$, the second image recordings and the knowledge of the second features 23 on the second object 22.

Alternatively, before the high-precision adjustment of the first object 12 into the first final location $E_a$, the second object 22 is gripped by the second industrial robot 21 within a gripping tolerance, not placed into the object holder 24 but rather held. The second industrial robot 21 is adjusted into a final position of the second industrial robot 21, in which the second object 22 is in the second final location. The second final location of the second object 22 is determined in the space coordinate system by the following steps: Orienting the at least two cameras $2_a$, $2_b$, in each case by means of the drive unit $3_a$, $3_b$ with at least partly overlapping fields of vision $8_a$, $8_b$, onto at least a part of the second features 23 of the second object 22. Recording second image recordings. Determining the second final location of the second object 22 in the space coordinate system from the positions $P_a$, $P_b$ of the recording means $1_a$, $1_b$, the angular orientations of the cameras $2_a$, $2_b$, the angular orientations being detected by the angle measuring units $4_a$, $4_b$, the second image recordings and the knowledge of the second features 23 on the second object 22.

In these cases of FIG. 3, the first final location for the first object 12 is calculated from the second final location of the second object 22 and a predefined relative location between the first object 12 and the second object 22. As the first object 12 is positioned with high precision relative to the second object 22, it is for example now possible to carry out a joining method for precisely connecting the two objects.

Figure 4:
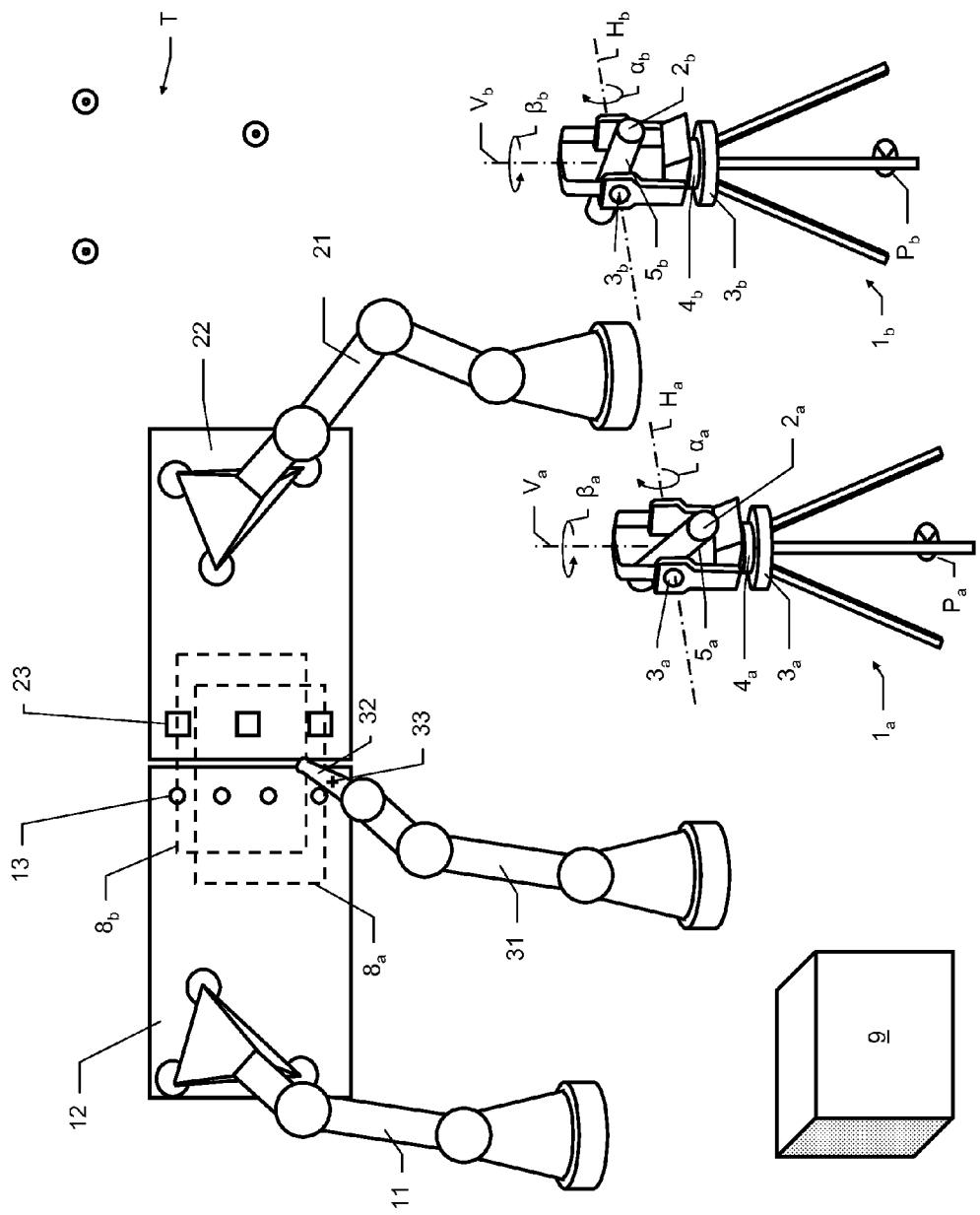
FIG. 4 shows the method and system with three industrial robots for positioning a first and second object and also a machining tool.

FIG. 4 shows a further embodiment of the invention, in which a second object 22 and also a third object 32, which is embodied as a machining tool, are adjusted with high precision.

The second object 22, which has known optically detectable second features 23, is gripped and held by a second industrial robot 21 within a gripping tolerance. A second compensating variable, which corrects the gripping tolerance, is determined for the second industrial robot 21, so that the second object is adjustable in a compensated manner in the space coordinate system by predefining a position of the second industrial robot 21. The second compensating variable is determined by orienting the two cameras $2_a$, $2_b$, in each case by means of the drive unit $3_a$, $3_b$ with at least partly overlapping fields of vision, onto at least a part of the second features 23 of the second object 22 which is held in a second compensating position of the second industrial robot 21. Second image recordings are recorded. The location of the second object 22 in the space coordinate system in the second compensating position of the second industrial robot 21 is determined from the positions $P_a$, $P_b$ of the recording means $1_a$, $1_b$, the angular orientations of the cameras $2_a$, $2_b$, the angular orientations being detected by the angle measuring units $4_a$, $4_b$, the second image recordings and the knowledge of the second features 23 on the second object 22. The second compensating variable is determined by adducing the second compensating position of the second industrial robot 21 and at least the determined location of the second object 22 in the second compensating position of the second industrial robot 21. Subsequently, the second object 22 is adjusted with high precision into a second final location. This takes place by the following steps which are repeated until the second final location is reached at a predefined tolerance. Firstly, further second image recordings are recorded. The current location of the second object 22 in the space coordinate system is determined from the positions $P_a$, $P_b$ of the recording means $1_a$, $1_b$, the angular orientations of the cameras $2_a$, $2_b$, the angular orientations being detected by the angle measuring units $4_a$, $4_b$, the further second image recordings and the knowledge of the second features 23 on the second object 22. The location difference between the current location of the second object 22 and the second final location is calculated. After the calculation of a new setpoint position of the second industrial robot 21 in consideration of the second compensating variable from the current position of the second industrial robot 21 and a variable linked to the location difference, the second industrial robot 21 is adjusted into the new setpoint position. These steps are repeated until the second object 22 has reached the second final location at the predefined tolerance.

In this embodiment of FIG. 4, instead of a relative positioning of the two objects 12 and 22 according to FIG. 3, both objects 12 and 22 are therefore individually positioned with high precision and independently of each other.

In a development of the invention, after the gripping of the second object 22, the second industrial robot 21 is adjusted into the second compensating position of the second industrial robot 21 for determining the second compensating variable.

A further variant embodiment of the invention makes provision for, before the steps which are repeated until the second final location is reached at a predefined tolerance, the second industrial robot 21 to be adjusted, in consideration of the second compensating variable, from the second compensating position into a position in which the second object 22 is positioned in a second approach location close to the second final location. Subsequently, the two cameras $2_a$, $2_b$ are oriented, in each case by means of the drive unit $3_a$, $3_b$ with at least partly overlapping fields of vision $8_a$, $8_b$, onto at least a part of the second features 23 of the second object 22 which is positioned in the second approach location.

As is likewise illustrated in FIG. 4, but also possible in the embodiment of FIG. 3, a third object 32, which is embodied as a machining tool, is provided. The machining tool 32 is held by a third industrial robot 31 within a holding tolerance. The machining tool 32 or a part coupled thereto of the third industrial robot 31, for example the receptacle of the machining tool 32, has known optically detectable third features 33. In order to be able to adjust the machining tool 32 in a compensated manner in the space coordinate system by predefining a position of the third industrial robot 31, a third compensating variable, which corrects the holding tolerance, is determined for the third industrial robot 31. For this purpose, firstly the two cameras $2_a$ and $2_b$ are oriented, in each case by means of the drive unit $3_a$ and $3_b$ with at least partly overlapping fields of vision $8_a$, $8_b$, onto at least a part of the third features 33. The machining tool 32 is in this case held in a third compensating position of the third industrial robot 31. Third image recordings are recorded. The location of the machining tool 32 in the space coordinate system in the third compensating position of the third industrial robot 31 is determined from the positions $P_a$, $P_b$ of the recording means $1_a$, $1_b$, the angular orientations of the cameras $2_a$, $2_b$, the angular orientations being detected by the angle measuring units $4_a$, $4_b$, the third image recordings and the knowledge of the third features 33. The third compensating variable is determined by adducing the third compensating position of the third industrial robot 31 and at least the determined location of the machining tool 32 in the third compensating position of the third industrial robot 31.

Furthermore, the invention makes provision for the machining tool 32 to be adjusted with high precision into a third final location by the following steps which are repeated until the third final location is reached at a predefined tolerance. Further third image recordings are recorded. The current location of the machining tool 32 in the space coordinate system is determined from the positions $P_a$, $P_b$ of the recording means $1_a$, $1_b$, the angular orientations of the cameras $2_a$, $2_b$, the angular orientations being detected by the angle measuring units $4_a$, $4_b$, the further third image recordings and the knowledge of the third features 33. The location difference between the current location of the third object 32 and the third final location is calculated. A new setpoint position of the third industrial robot 31 is calculated, in consideration of the third compensating variable, from the current position of the third industrial robot 21 and a variable linked to the location difference. Subsequently, the third industrial robot 31 is adjusted into the new setpoint position. These steps are repeated until the machining tool 32 is in the tolerance range of the third final location.

The machining tool 32 is for example a welding tool for the welding-together of the first object 12 and the second object 22. Any desired other machining tools, in particular joining tools, can likewise be used. Although a machining tool 32 in combination with a first object 12 and a second object 22, in particular for joining these objects, has been described at this point, the invention likewise includes the positioning of the machining tool relative to just one object. This may for example be the case in a machining tool which carries out an operation, for example a material removal step, on just one object.

The invention also includes the combinations of features which are not explicitly combined.

The described system components, in particular the measuring components such as the recording means, are distinguished by their mobility and flexibility. It is thus possible to carry out the described method by means of independent components which can be installed in a production system within a comparatively short time. Self-calibrating and self-referencing components allow sufficient procedural safety to be ensured even under difficult operating conditions. Even comparatively imprecise handling systems with relatively inaccurate measuring systems can be used for the high-precision positioning of objects on account of the determination of compensating variables and steps which are repeated until the final location is reached. The invention allows a rapid detection of the location of the objects to be carried out within a very large detection range without direct involvement in the process, in a contactless manner and with sufficient spacing. Pivoting of the cameras does not lead to a delay of the measuring process that is caused by a renewed referencing of the cameras, as renewed referencing may be dispensed with in accordance with the invention. The method and system according to the invention for the high-precision positioning of objects in space is thus distinguished by a high process speed.

We claim:

1. A method for the high-precision positioning of at least one object in a final location in space by means of an industrial robot, with a first industrial robot which can be adjusted into predefinable positions and a first optical recording means which is calibrated in a three-dimensional space coordinate system and positioned in a known first position having a known orientation, with an optically calibrated first camera for recording images within a determined first field of vision, a first drive unit for orienting the first camera causing an adjustment of the first field of vision and a first angle measuring unit, which is calibrated in the space coordinate system, for the high-precision detection of the angular orientation of the first camera, so that the first field of vision can be determined in the space coordinate system, at least one second optical recording means which is calibrated in the three-dimensional space coordinate system and positioned in a known second position having a known orientation, with an optically calibrated second camera for recording images within a determined second field of vision, a second drive unit for orienting the second camera causing an adjustment of the second field of vision and a second angle measuring unit, which is calibrated in the space coordinate system, for the high-precision detection of the angular orientation of the second camera, so that the second field of vision can be determined in the space coordinate system the at least two positions being set apart in such a way as to allow a three-dimensional image recording of the at least one object by means of the at least two recording means through at least partly overlapping fields of vision, the method comprising:

the first industrial robot gripping and holding a first object within a gripping tolerance, wherein the first object has a known optically detectable first feature;

determining a first compensating variable of a type which corrects the gripping tolerance, for the first industrial robot, so that the first object is adjustable in a compensated manner in the space coordinate system by predefining a position of the first industrial robot, the first compensating variable being determined by the steps of orienting the at least two cameras, in each case by means of the drive unit with at least partly overlapping fields of vision, onto at least a part of the first features of the first object which is held in a first compensating position of the first industrial robot;

recording first image recordings;

determining the location of the first object in the space coordinate system in the first compensating position of the first industrial robot from the positions of the recording means, the angular orientations of the cameras, the angular orientations detected by the angle measuring units, the first image recordings, and the knowledge of the first features on the first object; and determining the first compensating variable by adducing the first compensating position of the first industrial robot and at least the determined location of the first object in the first compensating position of the first industrial robot; and adjusting the first object with high precision into a first final location by the steps, which are repeated until the first final location is reached at a predefined tolerance, of:

recording further first image recordings;

determining the current location of the first object in the space coordinate system from the positions of the recording means, the angular orientations of the cameras, the angular orientations detected by the angle measuring units, the further first image recordings, and the knowledge of the first features on the first object;

calculating the location difference between the current location of the first object and the first final location;

calculating a new setpoint position of the first industrial robot in consideration of the first compensating variable from the current position of the first industrial robot and a variable linked to the location difference; and adjusting the first industrial robot into the new setpoint position.

2. A method according to claim 1, wherein, after the gripping of the first object, the first industrial robot is adjusted into the first compensating position of the first industrial robot for determining the first compensating variable.

3. A method according to claim 1, wherein, before the steps which are repeated until the first final location is reached at a predefined tolerance:

the first industrial robot is adjusted, in consideration of the first compensating variable, from the first compensating position into a position in which the first object is positioned at a first approach location close to the first final location; and the two cameras are oriented, in each case by means of the drive unit with at least partly overlapping fields of vision, onto at least a part of the first features of the first object which is positioned in the first approach location.

4. A method according to claim 1, wherein, before the high-precision adjustment of the first object into the first final location, a second object is gripped by a second industrial robot or by hand and placed into an object holder in a second final location in the space coordinate system.

5. A method according to claim 4, wherein the object holder is embodied in a positively centring manner in such a way that the second object is placed with high precision in the predefined second final location.

6. A method according to one of claims 5, wherein the first final location for the first object is calculated from the second final location of the second object and a predefined relative location between the first object and the second object.

7. A method according to claim 4, wherein the second object has known optically detectable second features and, after the placing of the second object in the object holder, the second final location of the second object in the space coordinate system is determined by the steps:
  orienting the at least two cameras, in each case by means of the drive unit with at least partly overlapping fields of vision, onto at least a part of the second features of the second object;
  recording second image recordings; and
  determining the second final location of the second object in the space coordinate system from the positions of the recording means, the angular orientations of the cameras, the angular orientations being detected by the angle measuring units, the second image recordings, and the knowledge of the second features on the second object.

8. A method according to claim 1, wherein, before the high-precision adjustment of the first object into the first final location:
  a second object, which has known optically detectable second features, is gripped and is held by a second industrial robot within a gripping tolerance, the second industrial robot is adjusted into a final position of the second industrial robot in which the second object is in a second final location, and
  the second final location of the second object in the space coordinate system is determined by the steps of:
    orienting the at least two cameras, in each case by means of the drive unit with at least partly overlapping fields of vision, onto at least a part of the second features of the second object;
    recording second image recordings; and
    determining the second final location of the second object in the space coordinate system from the positions of the recording means, the angular orientations of the cameras, the angular orientations being detected by the angle measuring units, the second image recordings, and the knowledge of the second features on the second object.

9. A method according to claim 1, wherein, before the high-precision adjustment of the first object into the first final location:
  a second object, which has known optically detectable second features, is gripped and is held by a second industrial robot within a gripping tolerance;
  a second compensating variable of this type, which corrects the gripping tolerance, is determined for the second industrial robot, so that the second object is adjustable in a compensated manner in the space coordinate system by predefining a position of the second industrial robot, the second compensating variable being determined by the steps:
    orienting the at least two cameras, in each case by means of the drive unit with at least partly overlapping fields of vision, onto at least a part of the second features of the second object which is held in a second compensating position of the second industrial robot;
    recording second image recordings;
    determining the location of the second object in the space coordinate system in the second compensating position of the second industrial robot from the positions of the recording means, the angular orientations of the cameras, the angular orientations being detected by the angle measuring units, the second image recordings and the knowledge of the second features on the second object, and
    determining the second compensating variable by adducing the second compensating position of the second industrial robot and at least the determined location of the second object in the second compensating position of the second industrial robot, and
  the second object is adjusted with high precision into a second final location by the steps, which are repeated until the second final location is reached at a predefined tolerance, of:
    recording further second image recordings;
    determining the current location of the second object in the space coordinate system from the positions of the recording means, the angular orientations of the cameras, the angular orientations being detected by the angle measuring units, the further second image recordings and the knowledge of the second features on the second object;
    calculating the location difference between the current location of the second object and the second final location; and
    calculating a new setpoint position of the second industrial robot in consideration of the second compensating variable from the current position of the second industrial robot and a variable linked to the location difference, and
    adjusting the second industrial robot into the new setpoint position.

10. A method according to claim 9, wherein, after the gripping of the second object, the second industrial robot is adjusted into the second compensating position of the second industrial robot for determining the second compensating variable.

11. A method according to claim 9, wherein, before the steps which are repeated until the second final location is reached at a predefined tolerance:
  the second industrial robot is adjusted, in consideration of the second compensating variable, from the second compensating position into a position in which the second object is positioned at a second approach location close to the second final location, and
  the two cameras are oriented, in each case by means of the drive unit with at least partly overlapping fields of vision, onto at least a part of the second features of the second object which is positioned in the second approach location.

12. A method according to claim 1, wherein:
  a third object, which is embodied as a machining tool, is held by a third industrial robot within a holding tolerance;
  the machining tool or a part coupled thereto of the third industrial robot has known optically detectable third features; and a third compensating variable of a type, which corrects the holding tolerance, is determined for the third industrial robot, so that machining tool is adjustable in a compensated manner in the space coordinate system by predefining a position of the third industrial robot, the third compensating variable being determined by the steps of:

orienting the at least two cameras, in each case by means of the drive unit with at least partly overlapping fields of vision, onto at least a part of the third features, the machining tool being held in a third compensating position of the third industrial robot;

recording third image recordings;

determining the location of the machining tool in the space coordinate system in the third compensating position of the third industrial robot from the positions of the recording means, the angular orientations of the cameras, the angular orientations being detected by the angle measuring units, the third image recordings and the knowledge of the third features; and determining the third compensating variable by adducing the third compensating position of the third industrial robot and at least the determined location of the machining tool in the third compensating position of the third industrial robot.

13. A method according to claim 12, wherein:
the machining tool is adjusted with high precision into a third final location by the steps, which are repeated until the third final location is reached at a predefined tolerance, of:

recording further third image recordings;

determining the current location of the machining tool in the space coordinate system from the positions of the recording means, the angular orientations of the cameras, the angular orientations being detected by the angle measuring units, the further third image recordings and the knowledge of the third features;

calculating the location difference between the current location of the third object and the third final location;

calculating a new setpoint position of the third industrial robot in consideration of the third compensating variable from the current position of the third industrial robot and a variable linked to the location difference; and adjusting the third industrial robot into the new setpoint position.

14. A method according to claim 1, wherein the variable linked to the location difference is formed by the location difference multiplied by a factor of less than or equal to 1.

15. A method according to claim 1, wherein:
the features are substantially known from a model which can be processed by an electronic data processing means;

by means of image processing carried out on an electronic data processing means, the features in the model and/or in the image recordings are identified and the features from the model and also the features from the image recordings are associated with one another; and the location of the object in the space coordinate system is determined from the detected position of the recorded features in the space coordinate system and the associated features.

16. A method according to claim 15, wherein the location of the recorded features relative to one another is determined and compared with the location of the features substantially known from the model relative to one another.

17. A method according to claim 16, wherein an error message is output on exceeding of a divergence between the relative location of the recorded features and the relative location of the features substantially known from the model.

18. A method according to claim 17, wherein the object is exchanged for a new object in the case of the error message.

19. A method according to claim 16, wherein the model is adapted to the detected object.

20. A method according to claim 19, wherein the adapted model determines the final location in the space coordinate system.

21. A method according to claim 1, wherein the at least two recording means are each embodied in such a way that in each case:

the camera is orientable by means of the drive unit about in each case a tilt axis, which is horizontal in relation to the space coordinate system, and a vertical standing axis; and the horizontal angular orientation about the standing axis and the vertical angular orientation about the tilt axis are each detected in the space coordinate system by the angle measuring unit.

22. A method according to claim 21, wherein the horizontal tilt axis and the vertical standing axis substantially intersect.

23. A method according to claim 22, wherein the at least two recording means are each embodied in such a way that:

the projection centre of the camera is arranged in each case at the intersection of the horizontal tilt axis and the vertical standing axis;

the position of the camera is coupled to the position of the recording means in each case independently of the angular orientation; and the location in the space coordinate system is determined from the positions of the cameras, the angular orientations of the cameras, the angular orientations being detected by the angle measuring units, the image recordings, and the knowledge of the features.

24. A method according to claim 22, wherein the at least two recording means are each embodied in such a way that:

the projection centre of the camera is arranged in each case outside the intersection of the horizontal tilt axis and the vertical standing axis;

the positions of the camera are determined in each case from the predefined eccentricity of the projection centre of the camera from the intersection, the angular orientations and the positions of the recording means; and the location in the space coordinate system is determined from the positions of the recording means, the eccentricities of the projection centres of the cameras, the angular orientations of the cameras, the angular orientations being detected by the angle measuring units, the image recordings and the knowledge of the features.

25. A method according to claim 1, wherein at least the first recording means has a first emitter, which is embodied for emitting a first structured light within the first field of vision of the first camera, which is orientable in conjunction with the first camera by means of the first drive unit and the angular orientation of which can be detected with high precision by means of the first angle measuring unit which is calibrated in the space coordinate system, wherein, in this step of recording the image recordings, the first structured light is projected from the first emitter onto the object in such a way that the first structured light lies in the field of vision of the second camera of the second recording means, and wherein the location of the object in the space coordinate system is additionally determined by means of triangulation from:

the positions of the recording means;
the angular orientations of the first emitter and the second camera, the angular orientations being detected by the angle measuring units; and
the image recordings of the second camera that image the first structured light.

26. A method according to claim 25, wherein at least the second recording means has a second emitter, which is embodied for emitting a second structured light within the second field of vision of the second camera, which is orientable in conjunction with the second camera by means of the second drive unit and the angular orientation of which can be detected with high precision by means of the second angle measuring unit which is calibrated in the space coordinate system, wherein, in the step of recording the image recordings:
the second structured light is projected from the second emitter onto at least the part of the features of the object in such a way that the second structured light lies in the field of vision of the first camera of the first recording means; and
the location of the object in the space coordinate system is additionally determined by means of triangulation from the positions of the recording means, the angular orientations of the second emitter and the first camera, the angular orientations being detected by the angle measuring units, and the image recordings of the first camera that image the second structured light and the knowledge of the features on the object.

27. A method according to claim 25, wherein the structured light is embodied as a projected laser line.

28. A method according to claim 25, wherein the structured light is embodied as a laser spot which is projected so as to be fanned out in the form of a laser line.

29. A method according to claim 25, wherein the structured light is embodied as a two-dimensionally projected pattern, in particular a laser raster.

30. A method according to claim 1, with an emission means which is arranged in a known third position, has a known orientation and has a third emitter which is embodied for emitting a third structured light, which is orientable by means of a third drive unit and the angular orientation of which can be detected with high precision by means of a third angle measuring unit which is calibrated in the space coordinate system, wherein, in the step of recording the image recordings, the third structured light is projected from the third emitter onto the object in such a way that the third structured light lies in the field of vision of the first camera of the first recording means, and wherein the location of the object in the space coordinate system is additionally determined by means of triangulation from:
the position of the first recording means;
the angular orientation of the first camera, the angular orientation being detected by the first angle measuring unit;
the angular orientation of the third emitter, the angular orientation being detected by the third angle measuring unit; and
the image recordings of the first camera that image the third structured light.

31. A method according to claim 1, wherein at least the first recording means has a first laser distance measuring means which is orientable in conjunction with the first camera by means of the first drive unit and the angular orientation of which can be detected with high precision by means of the first angle measuring unit which is calibrated in the space coordinate system.

32. A method according to claim 31, wherein the position of the first recording means in the space coordinate system is determined by aiming at stationary target marks by means of the first laser distance measuring means.

33. A method according to claim 31, wherein the location of the object in the space coordinate system is additionally determined by aiming at the features on the object.

34. A system for the high-precision positioning of at least one object in a final location in space by means of an industrial robot, comprising:
a first industrial robot which can be adjusted into predefinable positions;
a first optical recording means which is calibrated in a three-dimensional space coordinate system and positioned in a known first position having a known orientation, with an optically calibrated first camera for recording images within a determined first field of vision, a first drive unit for orienting the first camera causing an adjustment of the first field of vision and a first angle measuring unit, which is calibrated in the space coordinate system, for the high-precision detection of the angular orientation of the first camera, so that the first field of vision can be determined in the space coordinate system;
at least one second optical recording means which is calibrated in the three-dimensional space coordinate system and positioned in a known second position having a known orientation, with an optically calibrated second camera for recording images within a determined second field of vision, a second drive unit for orienting the second camera causing an adjustment of the second field of vision and a second angle measuring unit, which is calibrated in the space coordinate system, for the high-precision detection of the angular orientation of the second camera, so that the second field of vision can be determined in the space coordinate system, the at least two positions being set apart in such a way as to allow a three-dimensional image recording of the at least one object by means of the at least two recording means through at least partly overlapping fields of vision; and
a control device having a data processing means embodied for image processing, wherein the control device is data-connected to the first industrial robot and the at least two optical recording means in such a way that the image recordings recorded by the cameras are supplied to the control device, the angular orientations of the cameras that are detected by the angle measuring units are supplied to the control device, the drive units are activated by means of the control device for orienting the cameras and the first industrial robot is adjusted into positions which are predefined by the control device, the control device and the data processing means thereof being embodied in such a way that a first object, which has optically detectable first features known to the control device, is gripped and is held by the first industrial robot within a gripping tolerance, a first compensating variable of this type, which corrects the gripping tolerance, is determined for the first industrial robot by the control device, so that the first object is adjustable in a compensated manner in the space coordinate system by predefining a position of the first industrial robot, the first compensating variable being determined by means of the control device by the steps of:
orienting the at least two cameras, in each case by means of the drive unit with at least partly overlapping fields of vision, onto at least a part of the first features of the first object which is held in a first compensating position of the first industrial robot;

recording first image recordings;

determining the location of the first object in the space coordinate system in the first compensating position of the first industrial robot from the positions of the recording means, the angular orientations of the cameras, the angular orientations being detected by the angle measuring units, the first image recordings and the knowledge of the first features on the first object, and determining the first compensating variable by adducing the first compensating position of the first industrial robot and at least the determined location of the first object in the first compensating position of the first industrial robot and wherein the first object is adjusted with high precision by the control device into a first final location by the steps, which are repeated until the first final location is reached at a predefined tolerance, of:

recording further first image recordings;

determining the current location of the first object in the space coordinate system from the positions of the recording means, the angular orientations of the cameras, the angular orientations being detected by the angle measuring units, the further first image recordings and the knowledge of the first features on the first object;

calculating the location difference between the current location of the first object and the first final location;

calculating a new setpoint position of the first industrial robot in consideration of the first compensating variable from the current position of the first industrial robot and a variable linked to the location difference; and adjusting the first industrial robot into the new setpoint position.

35. A system according to claim 34, wherein the at least two recording means are each embodied in such a way that:

the camera is orientable by means of the drive unit about in each case a tilt axis, which is horizontal in relation to the space coordinate system, and a vertical standing axis; and the horizontal angular orientation about the standing axis and the vertical angular orientation about the tilt axis are each detected in the space coordinate system by the angle measuring unit.

36. A system according to claim 35, wherein the horizontal tilt axis and the vertical standing axis substantially intersect.

37. A system according to claim 36, wherein the at least two recording means are each embodied as video theodolite.

38. A system for the high-precision positioning of at least one object in a final location in space by means of an industrial robot, comprising:

a first industrial robot which can be adjusted into predefinable positions;

a first optical recording means which is calibrated in a three-dimensional space coordinate system and positioned in a known first position having a known orientation, with an optically calibrated first camera for recording images within a determined first field of vision, a first drive unit for orienting the first camera causing an adjustment of the first field of vision, and a first angle measuring unit, which is calibrated in the space coordinate system, for the high-precision detection of the angular orientation of the first camera, so that the first field of vision can be determined in the space coordinate system;

at least one second optical recording means which is calibrated in the three-dimensional space coordinate system and positioned in a known second position having a known orientation, with an optically calibrated second camera for recording images within a determined second field of vision, a second drive unit for orienting the second camera causing an adjustment of the second field of vision, a second angle measuring unit, which is calibrated in the space coordinate system, for the high-precision detection of the angular orientation of the second camera, so that the second field of vision can be determined in the space coordinate system, the at least two positions being set apart in such a way as to allow a three-dimensional image recording of the at least one object by means of the at least two recording means through at least partly overlapping fields of vision, and a control device having a data processing means embodied for image processing, wherein the control device is data-connected to the first industrial robot and the at least two optical recording means in such a way that the image recordings recorded by the cameras are supplied to the control device, the angular orientations of the cameras that are detected by the angle measuring units are supplied to the control device, the drive units are activated by means of the control device for orienting the cameras and the first industrial robot is adjusted into positions which are predefined by the control device, the control device and the data processing means thereof being configured to carry out the method according to claim 1.

39. A system for the high-precision positioning of at least one object in a final location in space by means of an industrial robot, comprising:

a first industrial robot which can be adjusted into predefinable positions;

a second industrial robot which can be adjusted into predefinable positions;

a first optical recording means which is calibrated in a three-dimensional space coordinate system and positioned in a known first position having a known orientation, with an optically calibrated first camera for recording images within a determined first field of vision, a first drive unit for orienting the first camera causing an adjustment of the first field of vision and a first angle measuring unit, which is calibrated in the space coordinate system, for the high-precision detection of the angular orientation of the first camera, so that the first field of vision can be determined in the space coordinate system;

at least one second optical recording means which is calibrated in the three-dimensional space coordinate system and positioned in a known second position having a known orientation, with an optically calibrated second camera for recording images within a determined second field of vision, a second drive unit for orienting the second camera causing an adjustment of the second field of vision; and a second angle measuring unit, which is calibrated in the space coordinate system, for the high-precision detection of the angular orientation of the second camera, so that the second field of vision can be determined in the space coordinate system, the at least two positions being set apart in such a way as to allow a three-dimensional image recording of the at least one object by means of the at least two recording means through at least partly overlapping fields of vision; and a control device having a data processing means embodied for image processing, wherein the control device is data-connected to the first industrial robot, the second industrial robot and the at least two optical recording means in such a way that the image recordings recorded by the cameras are supplied to the control device, the angular orientations of the cameras that are detected by the angle measuring units are supplied to the control device, the drive units are activated by means of the control device for orienting the cameras and the first industrial robot and the second industrial robot are adjusted into positions which are predefined by the control device, wherein the control device and the data processing means thereof are configured for carrying out the method according to claim 4.

40. A system for the high-precision positioning of at least one object in a final location in space by means of an industrial robot, comprising:

a first industrial robot which can be adjusted into predefinable positions;

a second industrial robot which can be adjusted into predefinable positions;

a third industrial robot which can be adjusted into predefinable positions and holds a third object, which is embodied as a machining tool, within a holding tolerance, the machining tool or a part coupled thereto of the third industrial robot having known optically detectable third features;

a first optical recording means which is calibrated in a three-dimensional space coordinate system and positioned in a known first position having a known orientation, with an optically calibrated first camera for recording images within a determined first field of vision, a first drive unit for orienting the first camera causing an adjustment of the first field of vision; and a first angle measuring unit, which is calibrated in the space coordinate system, for the high-precision detection of the angular orientation of the first camera, so that the first field of vision can be determined in the space coordinate system, at least one second optical recording means which is calibrated in the three-dimensional space coordinate system and positioned in a known second position having a known orientation, with an optically calibrated second camera for recording images within a determined second field of vision, a second drive unit for orienting the second camera causing an adjustment of the second field of vision and a second angle measuring unit, which is calibrated in the space coordinate system, for the high-precision detection of the angular orientation of the second camera, so that the second field of vision can be determined in the space coordinate system, the at least two positions being set apart in such a way as to allow a three-dimensional image recording of the at least one object by means of the at least two recording means through at least partly overlapping fields of vision; and a control device having a data processing means embodied for image processing, wherein the control device is data-connected to the first industrial robot, the second industrial robot, the third industrial robot and the at least two optical recording means in such a way that the image recordings recorded by the cameras are supplied to the control device, the angular orientations of the cameras that are detected by the angle measuring units are supplied to the control device, the drive units are activated by means of the control device for orienting the cameras, wherein the first industrial robot, the second industrial robot and the third industrial robot are adjusted into positions which are predefined by the control device, and the control device is configured for carrying out the method according to claim 12.

\* \* \* \* \*